Dec. 2, 1952     S. T. GRESHAM     2,620,220
MAIL DELIVERY VEHICLE AND EQUIPMENT
Filed Dec. 2, 1949
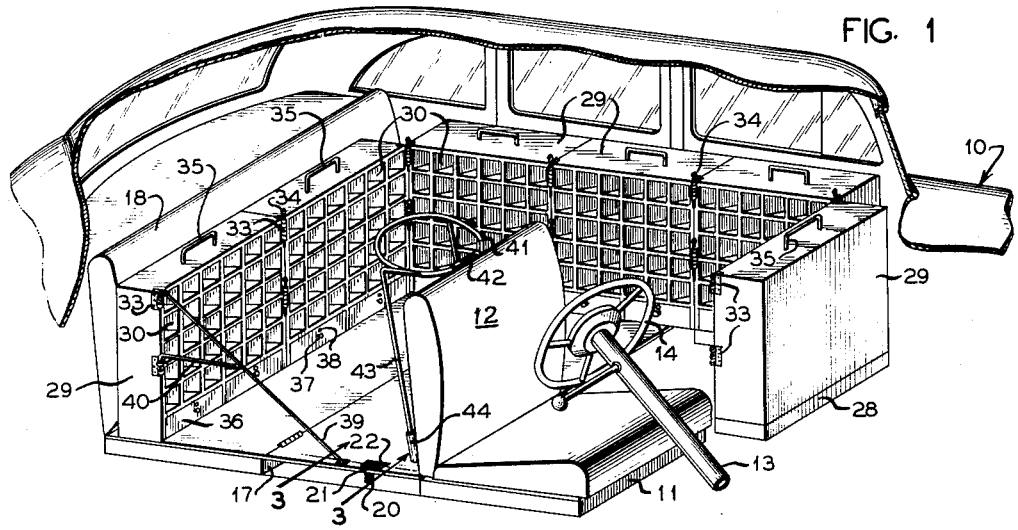
FIG. 1
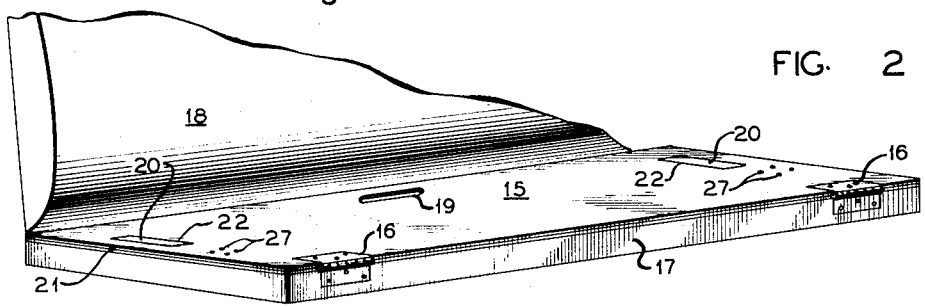
FIG. 2
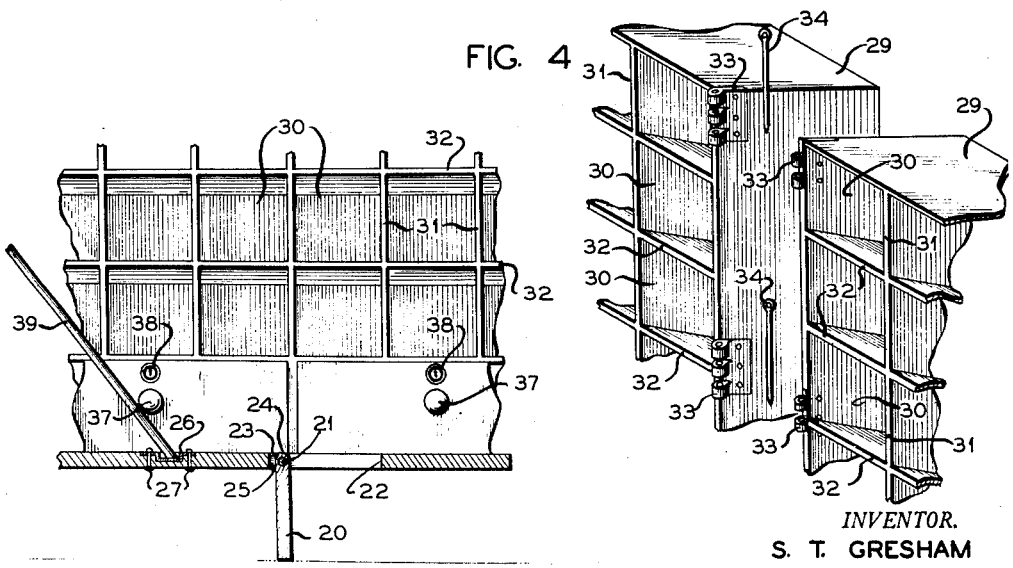
FIG. 4
FIG. 3
INVENTOR.
S. T. GRESHAM
BY
A. Yates Dowell
ATTORNEY Patented Dec. 2, 1952

2,620,220

UNITED STATES PATENT OFFICE 2,620,220

MAIL DELIVERY VEHICLE AND EQUIPMENT

Samuel T. Gresham, Neuse, N. C.

Application December 2, 1949, Serial No. 130,653

8 Claims. (Cl. 296—24)

This invention relates to communication, and more particularly to communication by mail between spaced points, some of which are urban.

In the delivery of mail, particularly along rural routes, approximately 32,500 mail cariers are employed, many of whom utilize automobiles or other vehicles to travel along the route, and from which they place mail in receptacles provided along the roadside for mail delivery. When automobiles are used a very substantial amount of time is lost in moving from the driver's seat at the left side of the vehicle to the right side thereof and reaching the receptacle in which the mail is deposited. This very substantial waste of time is inefficient, prohibits expeditious mail delivery, utilizes excessive man power, and is otherwise objectionable.

It is an object of the invention to provide for improved, more efficient mail delivery, requiring minimum time consumption and with greater ease and facility thus making it possible to handle approximately one-third more mail.

Another object of the invention is to provide a vehicle and equipment by means of which minimum movement of the operator is required in performing the necessary operations of depositing of mail from a vehicle into the individual receptacles along the roadway.

A further object of the invention is to provide a plurality of independent cabinets with compartments for assorted mail, which cabinets may be selectively used in assorting the mail and for containing the mail to be delivered, and which cabinets may be selectively arranged at the front, back, and along the side of the car opposite the driver for convenient access and consequent ready distribution of mail.

Another object of the invention is to detachably secure the cabinets together to provide a substantially unitary structure, and to provide bracing means so that the cabinets may be maintained in a definite relation without jostling or moving around within the vehicle.

Further objects and advantages of the invention will be apparent from the following description taken in conjunction with the accompanying drawings, wherein:

Fig. 1 is a fragmentary perspective view showing the interior of an automobile incorporating the features of this invention;

Fig. 2, a fragmentary perspective view of the back seat of the automobile with the pivoted shelf secured to the base of the seat and in folded position;

Fig. 3, a fragmentary sectional view on the line 3—3 of Fig. 1 showing the particular construction of the foldable legs and the socket for receiving the cabinet brace; and, Fig. 4, a fragmentary perspective view showing the particular construction of the cabinets and the manner of locking adjacent cabinets together.

Briefly stated, the invention comprises a vehicle such as an automobile with the steering column and conveniently located dash instruments on the right of the center of the vehicle, with the driver's seat extending only half way across the vehicle, and with a series of cabinets disposed across the front and back, and along the side of the vehicle where the seat beside the driver has been removed.

Along the side and at the front of the vehicle are suitable bases or supports, the upper portions of which are substantially in the same plane as the upper portion of the rear seat base. These bases are intended to receive and support removable cabinets at substantially the same level and there is further provided a pivoted shelf secured to the rear seat base which may be disposed forwardly between the back of the front seat and the front of the back seat to provide a continuous floor and which when the vehicle is in use as a pleasure car may be folded upon the top surface of the rear seat base with the rear seat cushion disposed thereon. This pivoted shelf is provided with legs disposed in slots and pivotally mounted so as to extend downwardly when the shelf is in operative position, and to be disposed within the slots when the shelf is in folded position.

With continued reference to the drawing an automobile 10 having a driver's seat 11 and back 12 disposed adjacent the right side of the vehicle is also provided with a steering column 13 and a steering wheel 14. The usual instruments are disposed on the vehicle dash in front of the operator and the left hand portion of the dash is free of instruments in order that a cabinet may be disposed rearwardly of the same without obscuring a usable portion of the dash.

The automobile 10 is modified to the extent of removing the front seat adjacent the driver's seat 11 and by providing a shelf 15 pivotally secured by hinges or the like 16 to the base 17 of the rear seat 18. Shelf 15 is provided with a finger engaging cutout 19 in order to facilitate movement of the same from operative to inoperative position and the shelf 15 when in operative position is intended to provide a continuous supporting surface at substantially the same level as the upper surface of the rear seat base 17.

In order to support the shelf 15 when in operative position there is provided a pair of legs 20, one adjacent each end of the shelf 15, these legs being pivotally mounted at 21 within slots 22 provided in the shelf 15. The legs 20 at their pivoted ends are provided with a curved portion 23 and with a flat portion 24 engaging the adjacent end surface 25 of the slot 22 in order to prevent movement of the leg 20 through slot 22 and beyond the surface of the shelf. Thus when the shelf 15 is in folded position as shown in Fig. 2 the legs 20 are completely nested within the slots 22 and there is provided an unobstructed upper surface for supporting the rear seat cushion not shown. The shelf 15 is also provided with a socket 26 which may be formed by a cup shaped metallic member disposed within the socket and secured in place by rivets 27 or other suitable fastening members. The function of socket 26 will be presently described.

The driver's compartment of the vehicle 10 is provided with a plurality of bases 28, the upper surface of which is in substantially the same plane as the upper surface of the rear seat base 17 and the shelf 15 when in operative position. Bases 28 serve to support cabinets in a manner which will be presently described.

In order to facilitate the sorting of mail the placing of the same in the delivery vehicle and the transportation thereof along the delivery route, there is provided a plurality of identical cabinets 29 of open face construction incorporating a plurality of pigeonholes 30 adapted to receive mail, the cabinets 29 being provided with vertically arranged parallel partitions 31 and with rearwardly and downwardly inclined horizontally disposed parallel partitions 32 forming the bottom of each pigeonhole 30. The partitions 32 are inclined as shown in Fig. 4 in order to facilitate the depositing of mail therein and to prevent inadvertent movement of mail therefrom as a result of sudden changes in direction of the automobile 10.

Cabinets 29 are provided with separable hinges 33 on each end wall thereof, these hinges being constructed to mate with corresponding hinges on the next adjacent cabinet and being pivotally locked thereto by removable hinge pins 34. The cabinets 29 are also provided with carrying handles 35 in order to facilitate manual transportation thereof to and from the automobile 10.

Cabinets 29 in addition to being provided with pigeonholes 30 may also be provided with drawers 36 having finger engaging knobs 37 and locks 38, these drawers being utilized to contain stamps or other articles necessary to the delivery or pickup of mail.

The cabinets 29 may be transported individually to and from the automobile 10 or may be transported in pairs with the appropriate hinges 33 locked together and with cabinets 29 in face to face relationship in order to provide a substantially closed container.

As shown in Fig. 1 the cabinets are disposed in the vehicle with two cabinets in the driver's compartment supported by the bases 28 and with the remaining cabinets supported by the shelf 15 and the base 17 of the rear seat 18. If desired suitable fastening or interlocking means not shown may be provided on the bottoms of the cabinets 29, the bases 28, shelf 15 and the rear seat base 17 in order to prevent undesirable movement of the cabinets when disposed in the vehicle. In order to prevent the cabinets positioned on the back seat from tipping forwardly in the event forward motion of the vehicle suddenly ceases, there may be provided a brace 39 having an angularly disposed end portion receivable in the appropriate hinge 33 and an arm 40 secured to the brace 39 and having an angularly disposed end receivable in the lower hinge 33. The forward end of the brace 39 is disposed in socket 26 and thus serves to prevent the above mentioned forward movement of these cabinets. It will be seen that because of the angular arrangement of the cabinets, they will be maintained in an upright position even without brace 39.

In order to facilitate collection of mail or parcels along the delivery route a generally circular bag holder 41 may be either pivotally or removably secured at 42 to the back of the front seat 12, bag holder 41 being supported in extended substantially horizontal position by downwardly extending braces 43, the lower ends of which may be received in sockets 44 attached to the back 12 of the front seat. The upper ends of the braces 43 may be either permanently secured to the bracket 41 as by welding or the like or may be removably received in sockets provided on the bracket 41 whereby such bracket may either be folded downwardly against the back 12 of the front seat or may be entirely removed from the vehicle when the same is to be used for pleasure driving.

It will be seen that by the above invention there has been provided a convenient and efficient means whereby a conventional righthand drive automobile may be converted into a mail delivery vehicle in which the mail is retained in sorted condition easily accessible to the driver and which provides ample space for the storage of parcels and the like, there being little modification of the vehicle necessary and the operation of converting the vehicle from a mail carrier to pleasure car being extremely simple and requiring little time.

It will be obvious to those skilled in the art that various changes may be made in the invention without departing from the spirit and scope thereof and therefore the invention is not limited by that which is shown in the drawing and described in the specification but only as indicated in the appended claims.

What is claimed is:

1. A mail delivery vehicle comprising a body, a driver's seat adjacent one side of the vehicle body from which the vehicle may be steered, mail sorting and containing cabinets disposed transversely and longitudinally within said vehicle within convenient reach of the driver, said cabinets having partitions forming pigeonhole compartments inclined downwardly from front to rear, means for fastening said cabinets together, a supporting shelf pivotally secured to the base of the rear seat of said vehicle adapted to be disposed in a folded position beneath the rear seat of said vehicle and adapted to be swung forwardly substantially parallel to the floor of the vehicle to serve as a platform, said shelf having pivotally mounted legs for supporting each end thereof in substantially horizontal position, a detachable brace secured to said cabinets and engaging a socket in said shelf whereby said cabinets are maintained in upright position and a bag holder detachably secured to the back rest of the driver's seat for supporting a mail bag in open position whereby mail may be conveniently deposited therein.

2. A mail delivery vehicle as defined in claim 1 in which the means for fastening the cabinets together comprises separable mating hinges secured to the side walls of each cabinet and hinge pins for locking said hinges together whereby a pair of said cabinets may be locked together in face to face relationship for transportation to and from said vehicle, said cabinets being swingable to open position to expose the pigeonholes therein whereby mail may be deposited or removed therefrom.

3. A mail delivery vehicle as defined in claim 1 in which said pivotally mounted legs are disposed in slots in said shelf, said legs being moved out of said slots by the force of gravity upon swinging of said shelf to forward position and automatically nesting within said slots upon moving said shelf to folded position.

4. A mail delivery vehicle as defined in claim 1 in which the detachable brace comprises a rod having portions receivable in the hinges secured to said cabinets whereby said brace may be pivotally moved out of position or may be detached from said cabinets.

5. A mail delivery vehicle comprising a body having a driver's position adjacent the right side of the vehicle from which the vehicle may be steered, mail assorting and containing cabinets disposed transversely and longitudinally within said vehicle within convenient reach of the driver, said cabinets having partitions forming pigeonhole compartments inclined downwardly from front to rear, means for fastening said cabinets together, a supporting shelf pivotally secured to the base of the rear seat of said vehicle, adapted to be disposed in a folded position beneath the rear seat of said vehicle and adapted to be swung forwardly substantially parallel to the front of said vehicle to serve as a platform, said shelf having pivotally mounted legs for supporting each end thereof in substantially horizontal position and a detachable brace secured to said cabinets and engaging a socket in said shelf whereby said cabinets are maintained in upright position.

6. A mail delivery vehicle comprising a body having a driver's position adjacent the right side of the vehicle from which the vehicle may be steered, mail assorting and containing cabinets disposed in said vehicle within convenient reach of the driver, said cabinets having portions forming pigeonhole compartments, means for fastening said cabinets together, a supporting shelf pivotally secured to the base of the rear seat of said vehicle adapted to be disposed in a folded position beneath the rear seat of said vehicle and adapted to be swung forwardly substantially parallel to the floor of said vehicle to serve as a platform, said shelf being provided with slots at each end thereof, legs positioned within said slots hingedly connected to said shelf for supporting each end thereof in substantially horizontal position, a detachable brace secured to said cabinets and engaging a socket in said shelf whereby said cabinets are maintained in upright position.

7. A motor vehicle comprising a body, an operator's supporting seat adjacent one side of the vehicle body from which the vehicle may be steered, a plurality of cabinets positioned in end to end relation within said motor vehicle body and facing the seat, means to connect each cabinet to the adjacent cabinet including hinge elements mounted on each front edge of the adjacent ends of each cabinet whereby adjacent cabinets may be moved so that their faces abut each other or extend at any angle up to a straight angle, the hinge elements including a removable pin to permit separation of the cabinets and the hinge elements being so arranged as to be connectable to any of the cabinets of the group whereby any cabinet may be located in the position of any other cabinet, said hinge connection being adapted to allow the cabinets to be placed at an angle to one another to provide a corner which makes a well-supported structure.

8. A delivery vehicle comprising a body having a supporting base in the rear thereof, an operator supporting seat adjacent one side of the vehicle and spaced from the other side of the vehicle from which an operator may steer the vehicle, a shelf hingedly connected to the front edge of a base at the rear of the operator supporting seat of the vehicle and adapted to be moved from a position overlying the base to a position between the base and the operator supporting seat, a second base positioned between said shelf and the front of the vehicle body to provide a flat support along with the first base and shelf, a plurality of cabinets each having one side open arranged in upright position in end to end relation with the open side facing the operator supporting seat and resting upon said bases and shelf, said cabinets being provided with partitions forming a plurality of compartments to receive small articles, means to connect the adjacent ends of the adjacent cabinets together, said means being adapted to secure any two cabinets with their open sides together to serve as a closed carrying case, and said cabinets each being interchangeable with each other whereby each may be positioned in any desired location within the vehicle.

SAMUEL T. GRESHAM.

REFERENCES CITED

The following references are of record in the file of this patent:

UNITED STATES PATENTS

| Number | Name | Date |
|---|---|---|
| 197,132 | Hill | Nov. 13, 1877 |
| 334,473 | Rogers | Jan. 19, 1886 |
| 474,587 | Yeager | May 10, 1892 |
| 514,488 | Moore | Feb. 13, 1894 |
| 640,315 | Parmelee | Jan. 2, 1900 |
| 654,660 | Markline | July 31, 1900 |
| 1,062,898 | Drew | May 27, 1913 |
| 1,195,676 | Hawkins | Aug. 22, 1916 |
| 1,238,480 | Austin | Aug. 28, 1917 |
| 1,284,712 | Krumland | Nov. 12, 1918 |